Figure 1:
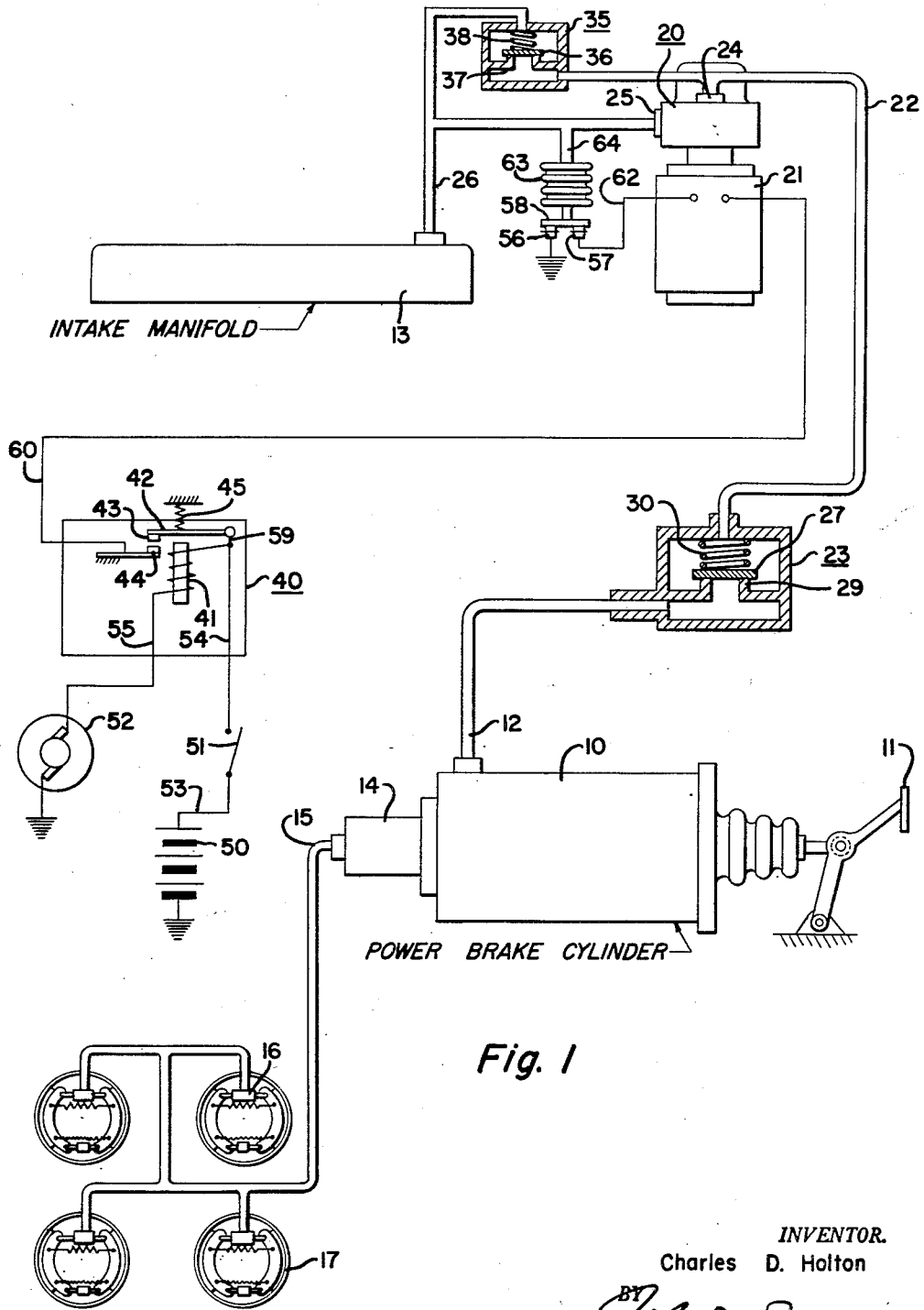

INVENTOR.
Charles D. Holton

April 12, 1955   C. D. HOLTON   2,705,870
AUXILIARY VACUUM PUMP FOR POWER BRAKES
Filed Sept. 17, 1953   3 Sheets-Sheet 2

INVENTOR.
Charles D. Holton
BY
John T. Martin
Attorney

INVENTOR.
Charles D. Holton

United States Patent Office 2,705,870
Patented Apr. 12, 1955

2,705,870

AUXILIARY VACUUM PUMP FOR POWER BRAKES

Charles D. Holton, Clio, Mich., assignor to General Motors Corporation, Detroit, Mich., a corporation of Delaware Application September 17, 1953, Serial No. 380,859

10 Claims. (Cl. 60—60)

This invention relates to power braking systems for motor vehicles, and more particularly to braking systems utilizing the vacuum power from the intake manifold of the engine.

Under certain adverse conditions motor vehicle engines tend to stall, hence at these times the failure of the vacuum power in the intake manifold of the engine results in failure of power to the power unit of the power braking system. While direct manual braking action can be obtained through the power brake unit of the power system, yet the pedal effort required for such manual actuation greatly exceeds that normally required for conventional types of manually actuated brake systems.

Also, there are conditions when braking action is desired even when the ignition switch is not turned "on." For example, if the driver parks on a hill there are times when it is desired to permit the car to roll forward or backward without starting the engine. Under this circumstance there will be no vacuum power for operation of the power unit of the power braking system so that here again the manual effort of operating the brake system is much higher than in conventional brake systems.

It is therefore an object of this invention to provide a supplementary or secondary source of vacuum power that is available for use when the primary source of vacuum power in a power actuated system fails to supply sufficient motive power for operation of the power brake unit.

It is thus another object of the invention to provide a stand-by electrically actuated secondary vacuum power source for a power actuated brake system that can be rendered effective at any time the engine of the motor vehicle is not operating.

Another object of the invention is to provide in a vacuum operated power braking system for a motor vehicle an auxiliary vacuum pump to provide vacuum power for actuation of the power unit of the braking system when the engine of the motor vehicle is not operating and to control operation of the pump in response to operation of the electric generator on the vehicle.

It is another object of the invention to provide a system in accordance with the foregoing objects wherein the secondary source of vacuum power is actuated automatically to take over vacuum power supply to the power unit of the brake system so long as the ignition switch for the engine is closed and insufficient vacuum power is supplied from the intake manifold of the engine for operation of the power unit of the power brake system, and to prevent actuation of the secondary vacuum power source at all times when the primary source of vacuum power from the intake manifold of the engine is sufficient for actuation of the power unit of the brake system.

It is still another object of the invention to provide a power system for the fluid brakes of a motor vehicle in accordance with the foregoing objects wherein the secondary source of vacuum power is also rendered operative automatically at any time the brake pedal of the motor vehicle is actuated or actuating fluid is supplied to the fluid actuated brakes of the motor vehicle, and this can be irrespective of whether the ignition switch for the engine is in the "on" or "off" position.

It is another object of the invention to provide in a vacuum operated power brake system a vacuum reservoir to maintain supply of vacuum power to the power unit of the brake system at times when the primary source of vacuum power from the intake manifold fails to be sufficient to operate the power unit of the brake system, and also to maintain sufficient source of vacuum power for operation of the power unit of the brake system in the interval between failure of the primary source of vacuum power from the intake manifold and the establishment of the secondary source of vacuum power from an electrically actuated supplemental vacuum power source that is rendered operative automatically upon failure of the vacuum power in the primary source.

It is also an object of the invention to provide a vacuum operated power brake system in accordance with the foregoing object wherein the vacuum reservoir is recharged intermittently during operation of the normal power operated brake system.

Further objects and advantages of the present invention will be apparent from the following description, reference being had to the accompanying drawings wherein a preferred form of the invention is clearly shown.

In the drawings:

In Figure 1 there is illustrated a diagrammatic view of a vacuum power operated brake system incorporating features of this invention.

Figure 2:
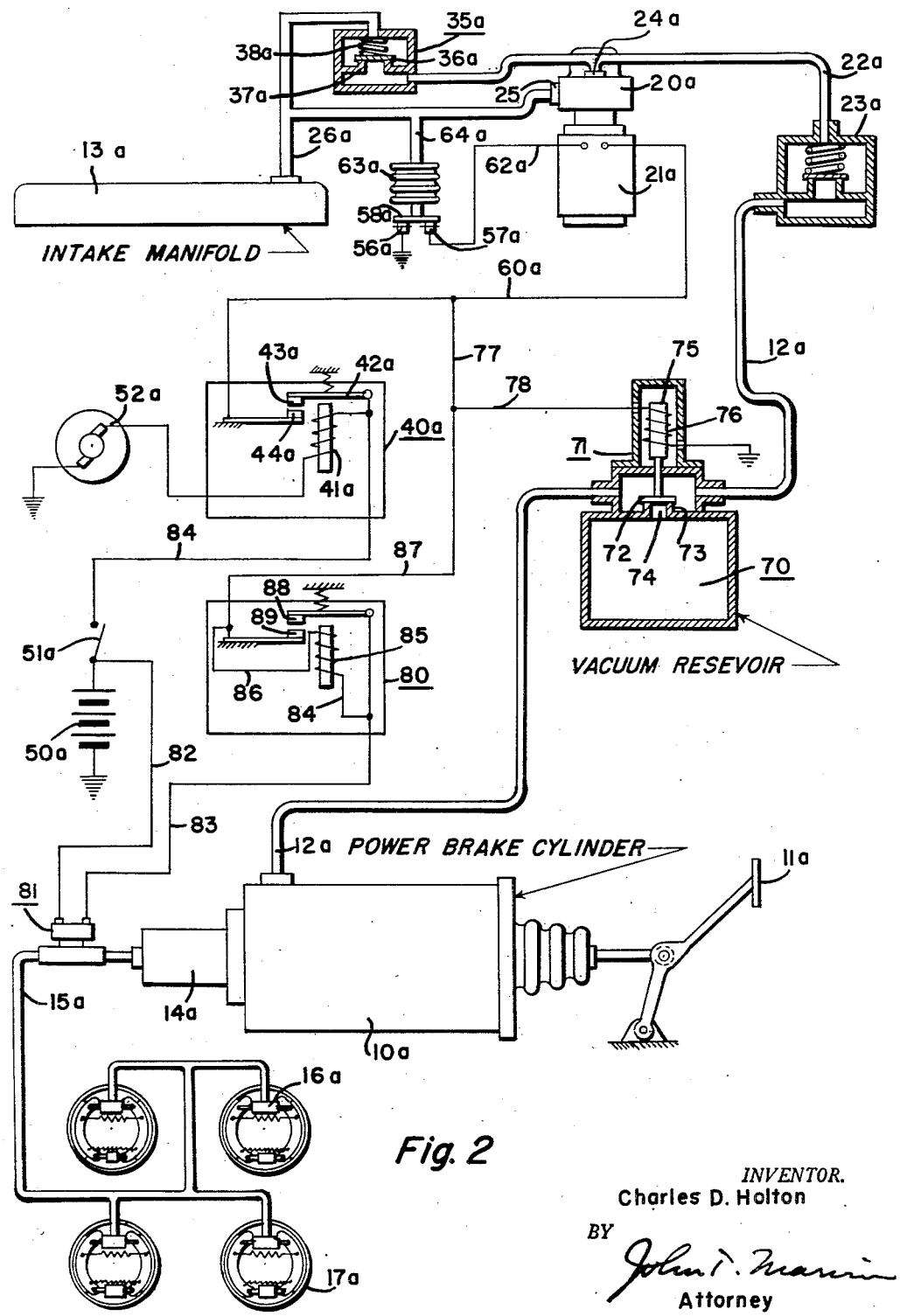

In Figure 2 there is illustrated a vacuum power operated brake system incorporating the features of the system of Figure 1 and amplifying the control features to provide for automatic operation of the secondary vacuum power source irrespective of whether the ignition switch for the engine is in the "on" or "off" position.

Figure 3:
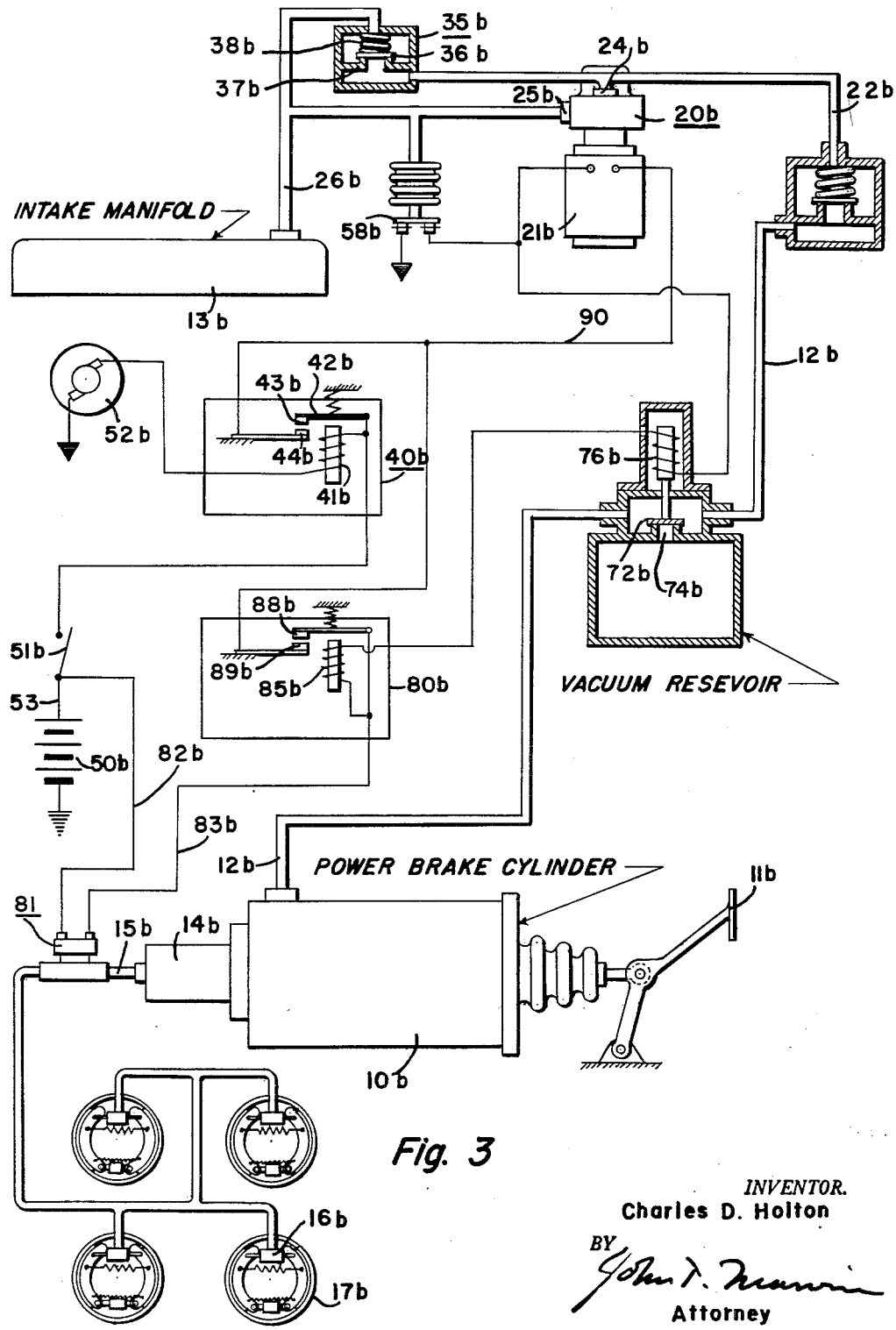

Figure 3 illustrates a modified arrangement of the controls of the system illustrated in Figure 2.

In this invention the vacuum operated power brake system includes a vacuum operated power brake unit 10. This vacuum operated power brake unit can be of any of the conventional forms of power units currently produced for this purpose, and which is well-known in the art. The power brake unit is operated by a foot pedal 11 suitably connected with the control valve of the power unit for regulating the supply of vacuum power to the unit from the vacuum line 12 that is suitably connected with the intake manifold 13 of the engine of the motor vehicle.

The power unit 10 includes a master cylinder 14 that supplies hydraulic fluid under pressure to the brake line 15. The brake line 15 is connected with the wheel cylinders 16 of the hydraulic brakes 17 provided on the motor vehicle.

Under normal operation, when the brake pedal 11 is actuated, the control valve of the power unit 10 is operated to provide control over the vacuum power for the power unit 10 which effects operation of the power piston of the power unit and it in turn operates the piston of the master cylinder in conventional and well-known manner. The power brake unit 10 can be of either the air suspended type in which atmospheric air is normally present on both sides of the power piston of the unit, and evacuation of the power cylinder on one side of the power piston by connection thereof with the vacuum line 12 results in power actuation of the power piston from the atmospheric pressure on the opposite side of the piston, or can be of the vacuum suspended type in which vacuum is normally provided on both sides of the power piston in constant communication with the vacuum line 12 so that operation of the control valve of the power unit will effect connection of one side of the power piston with the atmosphere to provide the power for actuating the power piston.

In either type of vacuum operated power brake unit the control is provided by the vacuum power source through the vacuum line 12 that is connected with the intake manifold 13 of the engine of the motor vehicle. Should the primary source of vacuum power in the manifold 13 of the engine fail for any reason, such as stalling of the engine with the ignition switch turned "on," suitable vacuum power fails to supply to the power unit 10 to effect the desired power operation of the unit. Under these circumstances the piston of the master cylinder is operated directly by the foot pedal 11 through the power unit 10. Without the aid of the power unit 10, the pedal pressure required for operation of the piston of the master cylinder is greatly increased.

Thus in this invention there is provided an auxiliary or secondary vacuum power source that becomes effective at any time the vacuum power in the primary source of the intake manifold of the engine fails, or reduces to a sufficiently low value as to be ineffective for satisfactory operation of the vacuum operated power unit 10.

The auxiliary or secondary vacuum power source comprises a vacuum pump 20 that is connected to an electric motor 21 for driving the pump. This electrically actuated device is normally inactive so long as the engine of the motor vehicle is running. However, when the vehicle engine stops the auxiliary or secondary vacuum power source is rendered effective to supply vacuum power to the vacuum operated power unit 10.

The vacuum pump 20 may be of any of the conventional types and has the inlet side thereof connected with the vacuum line 12 of the power unit 10 by a line 22, a check valve 23 being placed between the inlet 24 of the vacuum pump and the power unit 10. The discharge connection 25 of the vacuum pump 20 is connected with the intake manifold 13 of the vehicle engine through the pipe line 26.

The check valve 23 can be of any of the conventional types in which a valve element 27 is retained on a valve seat 29 by a spring 30 so that flow of fluid through the check valve 23 will be in a direction from the power unit 10 to the vacuum pump 20, the check valve preventing reverse flow of fluid, and thus preventing atmospheric air entering the power unit 10 through the vacuum line 12 whenever the engine of the motor vehicle is not operating.

A second check valve 35 is provided between the inlet connection 24 of the vacuum pump 20 and the line 26 connecting the outlet 25 of the pump 20 with the intake manifold 13. This check valve comprises a valve element 36 seated upon a valve seat 37 and retained thereon by a spring 38. This check valve 35 provides a by-pass connection around the vacuum pump 20 so that the primary vacuum power source, the intake manifold of the engine, will be directly connected with the vacuum line 12 of the power unit 10 through the check valves 35 and 23, and thereby provide for completely free flow of fluid from the power brake unit 10 to the intake manifold 13, the restriction of the vacuum pump itself being thus eliminated from the vacuum connection between the intake manifold 13 and the power unit 10.

To provide for automatic operation of the electrically actuated vacuum pump 20, a relay 40 is provided to control operation of the electric motor 21. The relay 40 comprises a solenoid actuating coil 41 adapted to move the contact arm 42 with the contact 43 thereof into engagement with the stationary contact 44 when the coil 41 is energized. A light spring 45 normally retains the contacts 43 and 44 in the open position illustrated in the drawing. The relay coil 41 is in series circuit with the motor battery 50, the motor ignition switch 51 and the motor vehicle generator 52 by the electric lines 53, 54 and 55. The battery 50 and the generator 52 are connected to ground in conventional manner.

Electric motor 21 is electrically in series with the battery 50, the ignition switch 51, the contacts 43 and 44, and the contacts 56 and 57 of a vacuum operated control switch 58 through the electric lines 53, 54, 59, 60. The motor is also connected to the common ground connection through the line 62.

The vacuum operated control switch 58 comprises an actuating bellows 63 connected with the vacuum line 26 through a pipe line 64. When the vehicle engine is operating, and a vacuum exists in the intake manifold 13, the vacuum operated control switch 58 is in open position whereby to break circuit to the electric motor 21 and thereby prevent operation of the pump 20 at any time the vacuum power in the intake manifold 13 is sufficient for proper operation of the power brake unit 10. When the vacuum power in the intake manifold 13 fails, or is below a predetermined value, the vacuum operated switch 58 is in closed position, as illustrated in the drawing, to connect the electric motor 21 in circuit with the battery 50 through the relay 40. Thus, the switch 58 provides a means for setting up the electric system for the motor 21 that it can be rendered operative when the vehicle engine is inoperative, and vice versa.

The relay 40, which controls the energization of the electric motor 21, is effective to close circuit through the contacts 43 and 44, the coil 41 being energized when the generator 52 is not operative, or is producing voltage output substantially below that of the voltage of the battery 50, and the ignition switch 51 is closed. Under this circumstance, that is with the generator 52 inoperative, current will flow from the battery 50 through the coil 41 into the common ground connection through the generator 52, thus energizing the coil 41 and closing the relay contacts 43 and 44 to start operation of the electric motor 21, it being understood that at this time the switch 58 is in closed position as a result of failure of the vacuum power in the primary source 13.

When the engine of the motor vehicle is restarted, and the generator 52 is operated thereby and produces sufficient voltage output to equal or exceed the voltage of the battery 50, the coil 41 will be deenergized and thereby release the contact arm 42 of the relay 40 and open the electric circuit to the electric motor 21.

Thus, at any time the ignition switch 51 is closed and the vehicle engine stalls for any reason, resulting in a loss of vacuum power in the manifold 13, the electrically actuated vacuum pump 20 will be operated to provide vacuum power for the vacuum operated power unit 10. At no time therefore will the vacuum power system for the power brake unit be ineffective when the ignition switch is closed irrespective of the operation or non-operation of the engine of the vehicle.

In Figure 2 there is illustrated a modified and supplementary system for controlling the operation of the secondary auxiliary vacuum power source when the motor ignition switch is in the open position. At times, it is desired to use the brakes of a motor vehicle even though the engine is not operating and the ignition switch is not on, for example, when permitting a car to roll forwardly or backwardly down a hill. Under this circumstance, if vacuum power is not available for operation of the vacuum operated power unit, the operator of the vehicle is left with only the direct manual operation of the brakes, which operation through the power unit is rather difficult. Thus in Figure 2 there is illustrated a system arrangement wherein the auxiliary or secondary vacuum power source is rendered operable whenever the brake pedal is manually operated, and the ignition switch is in the "off" position.

The control system for the secondary vacuum power source contains all of the elements of the system illustrated in Figure 1, and the elements function in exactly the same manner as heretofore described with reference to Figure 1, hence all of those elements of identical nature are referred to in Figure 2 by the same reference numerals as indicated in Figure 1 with the exception that the suffix "a" is added.

In the system of Figure 2, between the check valve 23a and the vacuum line 12a there is placed a vacuum reservoir 70. This vacuum reservoir 70 has an electrically operated valve 71 that controls connection of the reservoir 70 with the vacuum line 12a between the check valve 23a and the vacuum operated power unit 10a. This electrically operated valve 71 includes a valve element 72 seating upon a valve seat 73 and closing the opening 74 that connects with the reservoir 70. The valve element 72 has the armature 75 that is operated by the electric coil 76 to lift the valve 72 from its seat 73 upon energization of the coil 76. This will connect the reservoir 70 with the vacuum line 12a. The electric coil 76 has one side thereof connected with the relay contacts 43a and 44a of the relay 40 through the electric lines 77 and 78, the other end of the electric coil 76 being connected with the common ground. Thus, whenever the relay 40a is energized, the valve 72 opens the port 74 to provide for a recharge or evacuation of the reservoir 70 during operation of the secondary vacuum power source, that is the vacuum pump 20a. Thus, the vacuum reservoir 70 will be in an effective condition for operation of the vacuum power operated power unit 10a at any time irrespective of the number of times the engine of the vehicle stalls and even though the operator of the vehicle should turn off the ignition switch 51a after several stallings of the engine and then for some reason require power operation of the brakes. The reservoir 70 will thus provide for any emergency brake operation even though the primary vacuum power source has failed for some time.

Also, since the valve 72 is normally closed, the vacuum reservoir 70 will continuously maintain a power charge of vacuum which will be effective for operation of the power brake unit even though the engine has not been operated for some time. This reserve vacuum power is desired in the event the operator of the vehicle should, without starting the vehicle engine, permit the vehicle to roll down a hill and require immediate power braking operation. Under this circumstance a relay 80 is placed in series with a fluid actuated switch 81 placed in the brake line 15a to the brakes 17a. When the brake pedal 11a is actuated, hydraulic fluid under pressure will close the fluid actuated switch 81 and thereby energize the relay 80 to effect electric connection of the solenoid coil 76 with resultant opening of the valve 72 for direct connection of the vacuum reservoir 70 with the power unit 10a. This electric connection with the solenoid coil 76 is made through the electric lines 82, 83, 84, the relay solenoid coil 85 and lines 86, 87, and 78.

Simultaneously with energization of solenoid coil 76, relay coil 85 is energized to close contact 88 upon the stationary contact 89 and thereby provide a direct circuit through the electric lines 87, 77, and 60a to the electric motor 21a for starting the electric motor. It is understood that at this time, with the ignition switch in the "off" position, and the vehicle engine inoperative, the vacuum operated control switch 58a is in the closed position, as illustrated in Figure 2 so that electric circuit is completed to the common ground connection.

Thus, when the electric motor 21a starts operation of the secondary vacuum power source 20a, the interval of time required for evacuation of the conduit lines 12a and 22a will cause no failure of the power brake system because the vacuum reservoir 70 is now in direct connection with the vacuum line 12a to supply the vacuum power to the unit 10a until the vacuum pump 20a can take over the desired operation.

Also, in the system illustrated in Figure 2, when the motor ignition switch 51a is in closed position, and the vehicle engine is operating normally with the intake manifold supplying vacuum power to the vacuum power operated power unit 10a, whenever the brakes are operated, the pressure actuated switch 81 will close electric circuit. When this occurs electric circuit will be made through the relay coil 85 and through the solenoid coil 76 to open the valve 72 and thereby provide for recharging or re-evacuation of the vacuum reservoir 70 to maintain a fully charged vacuum condition.

However, the electric motor 21a of the vacuum pump 20a is not rendered operative by this energization of the relay 80 for the reason that the vacuum operated electric switch 58a is now in "open" position whereby the electric circuit to the common ground connection is broken from the electric motor 21a.

The brake control system of Figure 2 therefore provides for emergency power actuation of the power unit irrespective of whether the ignition switch is in the "on" or "off" position, or whether the engine of the vehicle is or is not operating, and irrespective of whether the primary source of vacuum power has failed or has been lost for any substantial length of time.

In Figure 3 there is illustrated a slightly modified arrangement of the wiring circuit diagram of Figure 2 wherein the relays 40b, and 80b together with the solenoid coil 76b and the electric motor 21b are all completely disconnected from the electrical system, and thus operatively ineffective, so long as the primary source of vacuum power in the intake manifold is sufficient to maintain operation of the power brake unit 10. Since all of the elements illustrated in Fig. 3 are identical with the elements in Figure 2, they will retain the same reference numerals with the exception that the suffix "b" is added to the numerals.

In the system arrangement of Figure 3 the solenoid coil 76b is placed in series connection only with the relay coil 85b of the relay 80b, the connection between the relay coil 76b and the relay 40b now being disconnected. Further, the one end of the solenoid coil 76b that was previously connected with the common ground connection is now connected directly with the vacuum operated control switch 58b through the electric line 90. Thus, when the vacuum operated control switch 58b opens circuit through its contacts, the entire electrical system for supplemental control of the vacuum pump 20b is completely disconnected so that no actuation of any of the elements of the control system will occur so long as the primary source of vacuum power is sufficient to provide for normal operation of the power unit 10a.

While the form of embodiment of the invention as herein disclosed constitutes a preferred form, it is to be understood that other forms might be adopted as may come within the scope of the claims which follow.

What is claimed is as follows:

1. In a power braking system for a motor vehicle, the combination of, a vacuum regulated power unit for operating the fluid brakes of the motor vehicle, a primary source of vacuum power operably connected with said power unit, an electrically actuated secondary source of vacuum power operably connected with said power unit, and responsive to operation of the engine of the motor vehicle to render the same active during non-operation of the engine and inactive during operation of the engine, a check valve between said secondary source and said power unit to disconnect both the primary source and the secondary source from the power unit upon ineffectiveness of the vacuum power sources, a vacuum reservoir, electrically actuated valve means connecting said reservoir to said power unit, and electrical means rendered active by operation of the brakes of the motor vehicle actuating said valve means thereby to connect said reservoir with said power unit.

2. In a power braking system for a motor vehicle, the combination of, a vacuum regulated power unit operably connected with the fluid brakes of the motor vehicle, a primary source of vacuum power operably connected with said power unit normally to effect operation thereof thereby, an electrically actuated vacuum pump having an inlet and an outlet providing a secondary source of vacuum power, operably connected with said power unit, an electrical control means actuated by operation of the engine of the vehicle operably connected with said pump to render the same operative during ineffective operation of the primary source of power and inoperative during effective operation of the primary source of power, a pipe connecting the inlet of the secondary source with said power unit, a pipe connecting the outlet of the secondary source with said primary source, a one way check valve in said first mentioned pipe disconnecting said secondary source and thus said primary source from said power unit when vacuum power fails in the said sources, a vacuum reservoir, and electrically operated valve means connecting said reservoir to said power unit, said valve means being rendered active by said control means or by electrical means rendered active by operation of the brakes of the motor vehicle to connect said reservoir with said power unit.

3. In a power braking system for a motor vehicle, the combination of, a vacuum regulated power unit for operating the fluid brakes of the motor vehicle, a primary source of vacuum power connected with said power unit and comprising the intake manifold of the engine of the motor vehicle normally to effect operation of the power unit thereby, a normally ineffective electrically actuated secondary source of vacuum power operably connected with said power unit, and an electrical control means responsive to the voltage supplied by the generator of the motor vehicle and operably connected with said electrically actuated secondary source to render said secondary source active during periods of no voltage supply from the generator and inactive during periods of voltage supply from the generator.

4. In a power braking system for a motor vehicle, the combination of, a vacuum regulated power unit for operating the fluid brakes of the motor vehicle, a primary source of vacuum power connected with said power unit and comprising the intake manifold of the engine of the motor vehicle normally to effect operation of the power unit thereby, a normally ineffective electrically actuated secondary source of vacuum power operably connected with said power unit, an electric control means responsive to the voltage supplied by the generator of the motor vehicle and operably connected with said electrically actuated secondary source to render said secondary source active during periods of no voltage supply from the generator and inactive during periods of voltage supply from the generator, and control means in circuit between said electrically actuated secondary source and said electric control means to render the electric circuit therebetween ineffective during effective operation of the primary source and effective during ineffective operation of the primary source.

5. In a power braking system for a motor vehicle, the combination of, a vacuum regulated power unit for operating the fluid brakes of the motor vehicle, a primary source of vacuum power connected with said power unit and comprising the intake manifold of the engine of the motor vehicle normally to effect operation of the power unit thereby, a normally ineffective electrically actuated secondary source of vacuum power operably connected with said power unit; a vehicle generator, an electric relay, an ignition switch and a vehicle battery in series electrical connection, said relay having control contacts in electrical series connection with said electrically actuated secondary source to control the same, said relay being active to close electric circuit to said secondary source during inaction of said generator and inactive to open electric circuit to said secondary source during running operation of the generator.

6. In a power braking system for a motor vehicle, the combination of, a vacuum regulated power unit for operating the fluid brakes of the motor vehicle, a primary source of vacuum power connected with said power unit and comprising the intake manifold of the engine of the motor vehicle normally to effect operation of the power unit thereby, a normally ineffective electrically actuated secondary source of vacuum power operably connected with said power unit, a first electric control system including the ignition switch, the generator of the motor vehicle and an electric relay connected in electrical circuit with said second source, said second source being rendered operative by said first system when the ignition switch is closed and the generator is inactive, and being rendered inoperative with the ignition switch closed and the generator operative, and a second electrical control system comprising a brake pedal responsive electric switch and an electric relay in electrical connection with said secondary source, said secondary source being rendered effective by said second system upon closing of circuit through said pedal actuated switch and ineffective when circuit is opened through said pedal actuated switch.

7. In a power braking system for a motor vehicle, the combination of, a vacuum regulated power unit for operating the fluid brakes of the motor vehicle, a primary source of vacuum power connected with said power unit and comprising the intake manifold of the engine of the motor vehicle normally to effect operation of the power unit thereby, a normally ineffective electrically actuated secondary source of vacuum power operably connected with said power unit, a first electric control system including the ignition switch, the generator of the motor vehicle and an electric relay connected in electrical circuit with said second source, said second source being rendered operative by said first system when the ignition switch is closed and the generator is inactive, and being rendered inoperative with the ignition switch closed and the generator operative, and a second electrical control system comprising a brake pedal responsive electric switch and an electric relay in electrical connection with said secondary source, said secondary source being rendered effective by said second system upon closing of circuit through said pedal actuated switch with said aforesaid ignition switch being open or closed and ineffective when circuit is opened through said pedal actuated switch.

8. In a power braking system for a motor vehicle, the combination of, a vacuum regulated power unit for operating the fluid brakes of the motor vehicle, a primary source of vacuum power connected with said power unit and comprising the intake manifold of the engine of the motor vehicle normally to effect operation of the power unit thereby, a normally ineffective electrically actuated secondary source of vacuum power operably connected with said power unit, a first electric control system including the ignition switch, the generator of the motor vehicle and an electric relay connected in electrical circuit with said second source, said second source being rendered operative by said first system when the ignition switch is closed and the generator is inactive, and being rendered inoperative with the ignition switch closed and the generator operative, a second electrical control system comprising a brake pedal responsive electric switch and an electric relay in electrical connection with said secondary source, said secondary source being rendered effective by said second system upon closing of circuit through said pedal actuated switch with said aforesaid ignition switch being open or closed and ineffective when circuit is opened through said pedal actuated switch, and control means in circuit with said first and second systems and responsive to said primary source rendering the said systems ineffective during effective operation of the primary source and effective during ineffective operation of the primary source.

9. In a power braking system for a motor vehicle, the combination of, a vacuum regulated power unit for operating the fluid brakes of the motor vehicle, a primary source of vacuum power connected with said power unit and comprising the intake manifold of the engine of the motor vehicle normally to effect operation of the power unit thereby, a normally ineffective electrically actuated secondary source of vacuum power operably connected with said power unit, a vacuum reservoir in the operating connection between said power unit and said secondary source and including an electrically operated valve to connect said vacuum reservoir with said power unit when said valve is operated, a check valve in the connection between said reservoir and said secondary source to prevent flow of fluid to said reservoir, a first electric control system including the ignition switch, the generator of the motor vehicle and an electric relay connected in electrical circuit with said second source, said second source being rendered operative by said first system when the ignition switch is closed and the generator is inactive, and being rendered inoperative with the ignition switch closed and the generator operative, and a second electrical control system comprising a brake pedal responsive electric switch and an electric relay in electrical connection with said secondary source and in electrical connection with said electrically actuated valve, said secondary source and said electrically actuated valve being rendered effective by said second system upon closing of circuit through said pedal actuated switch and ineffective when circuit is opened through said pedal actuated switch.

10. In a power braking system for a motor vehicle, the combination of, a vacuum regulated power unit for operating the fluid brakes of the motor vehicle, a primary source of vacuum power connected with said power unit and comprising the intake manifold of the engine of the motor vehicle normally to effect operation of the power unit thereby, a normally ineffective electrically actuated secondary source of vacuum power operably connected with said power unit, and an electrical control means responsive to the voltage supplied by the generator of the motor vehicle and operably connected with said electrically actuated secondary source to render said secondary source active during periods of voltage supply from the generator less than the voltage of the vehicle battery supplied by the generator and inactive during periods of voltage supply from the generator greater than the voltage of the battery supplied by the generator.

References Cited in the file of this patent

UNITED STATES PATENTS

| | | |
|---|---|---|
| 2,021,857 | Hueber | Nov. 19, 1935 |
| 2,293,542 | Hamilton | Aug. 18, 1942 |
| 2,520,650 | Oishei et al. | Aug. 29, 1950 |
| 2,583,327 | Rappl | Jan. 22, 1952 |